Dec. 22, 1942.    E. A. ROCKWELL    2,305,638
HYDRAULIC BRAKE TRAILER SYSTEM
Filed June 13, 1941    8 Sheets-Sheet 1

INVENTOR
Edward A. Rockwell
BY
Arthur Knight
ATTORNEY

Dec. 22, 1942.  E. A. ROCKWELL  2,305,638
HYDRAULIC BRAKE TRAILER SYSTEM
Filed June 13, 1941  8 Sheets-Sheet 3

INVENTOR
Edward A. Rockwell
BY
Arthur Wright
ATTORNEY

Dec. 22, 1942.  E. A. ROCKWELL  2,305,638
HYDRAULIC BRAKE TRAILER SYSTEM
Filed June 13, 1941   8 Sheets-Sheet 4
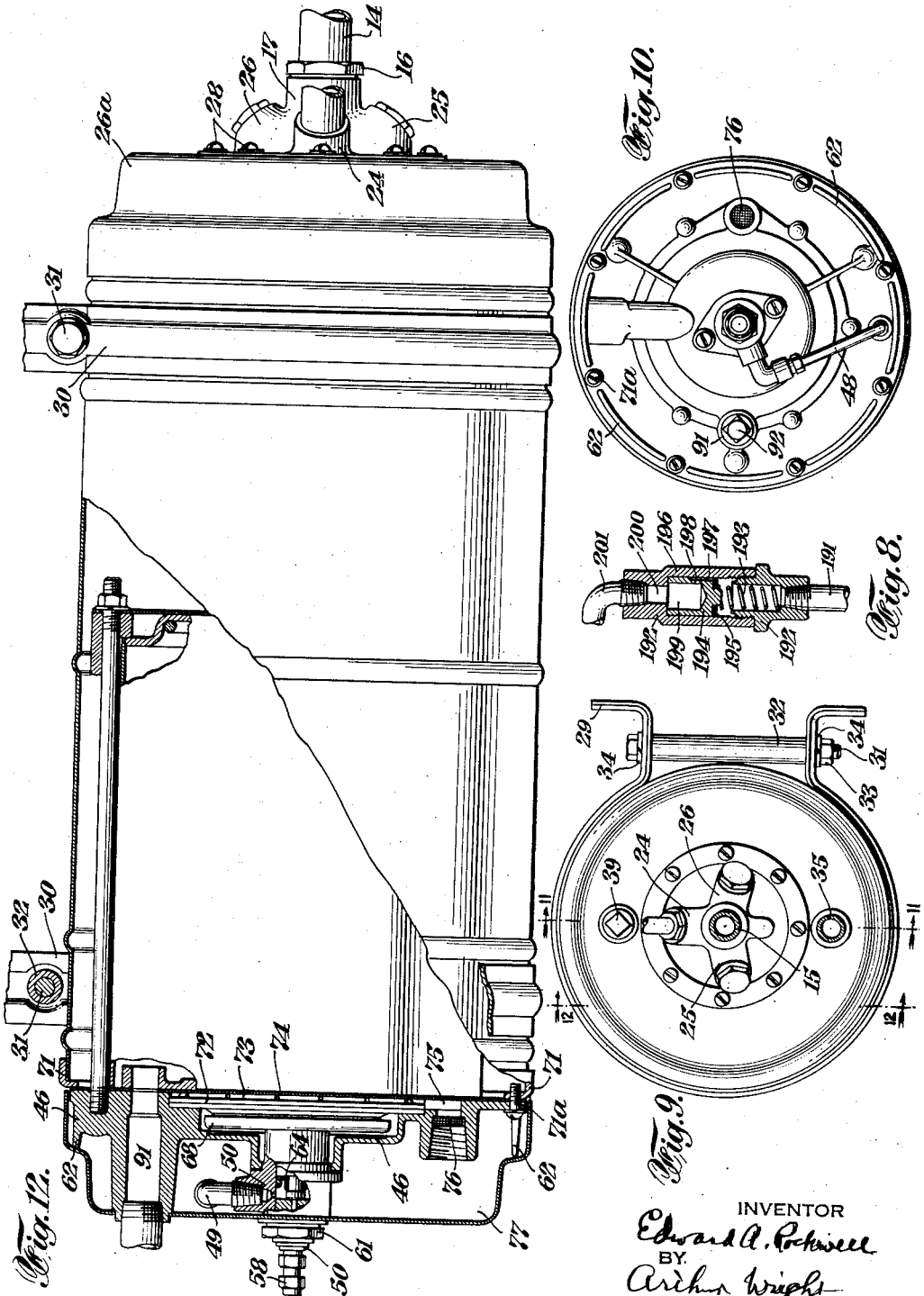
INVENTOR
Edward A. Rockwell
BY
Arthur Wright
ATTORNEY

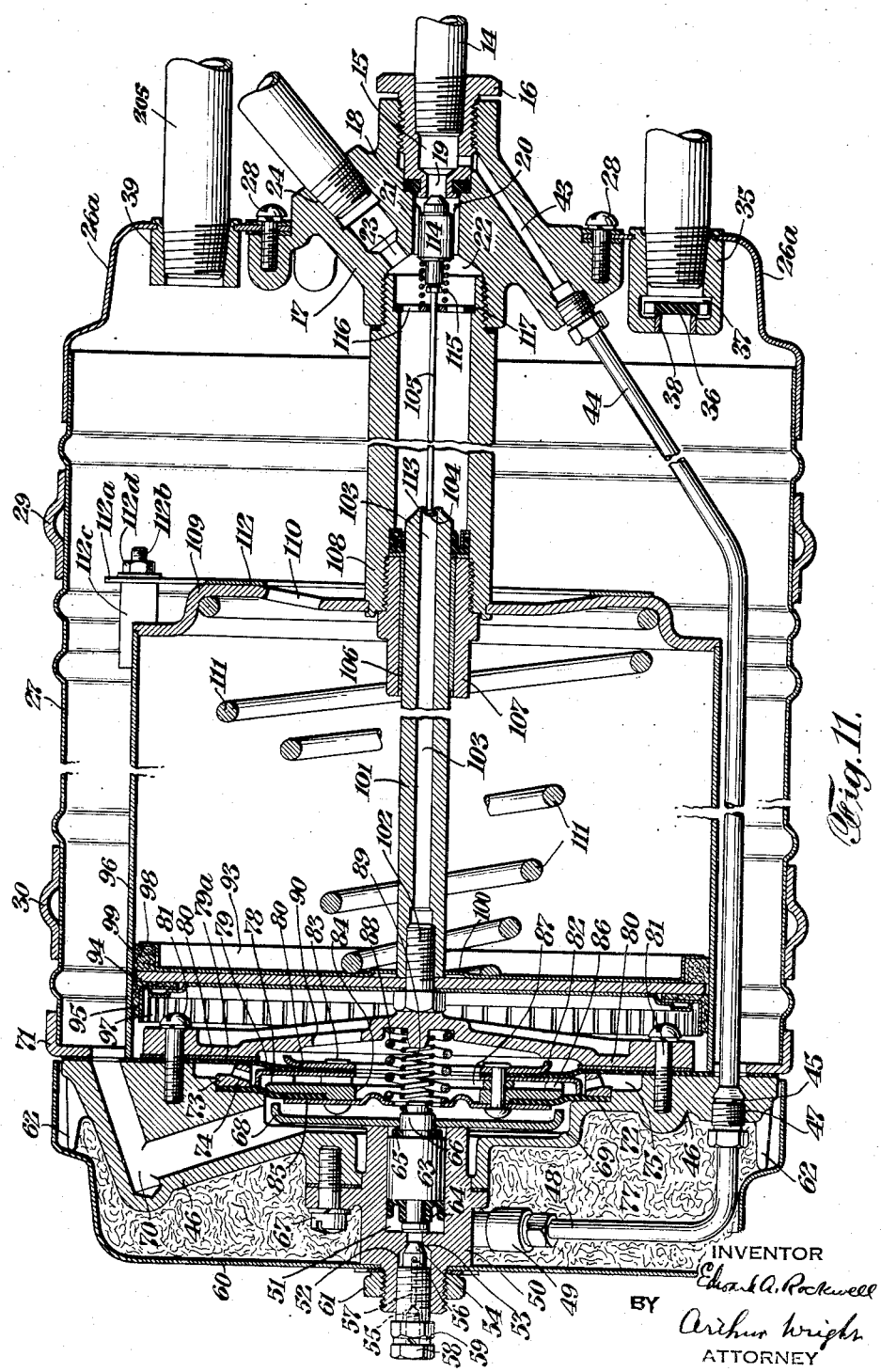

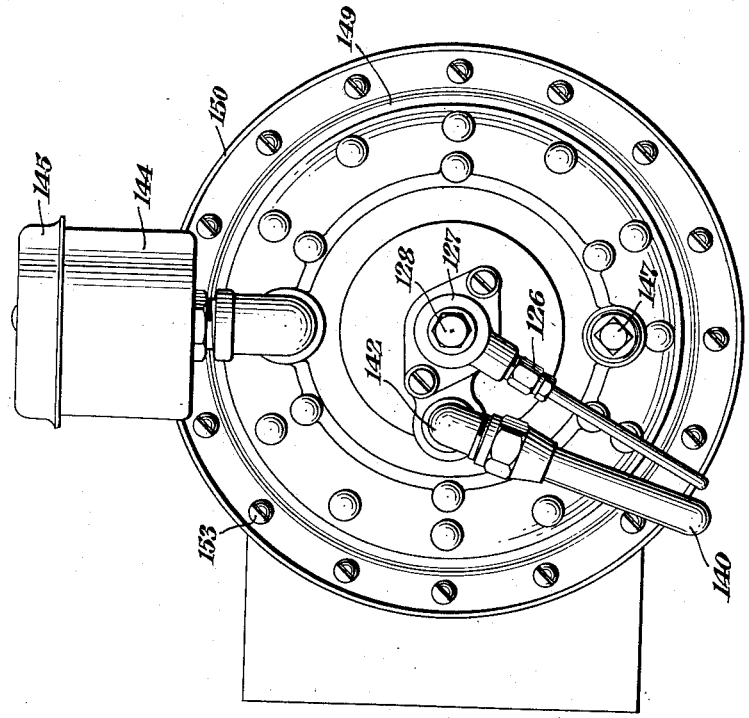
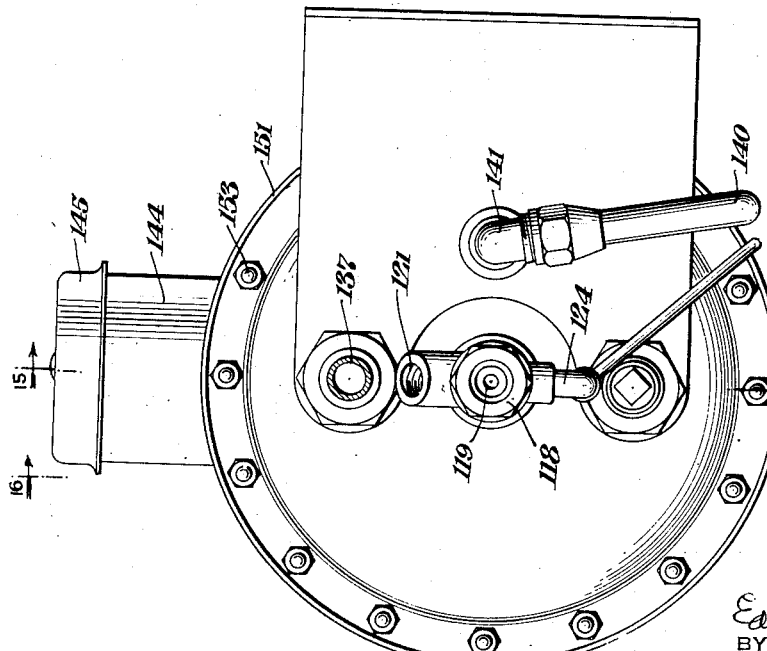

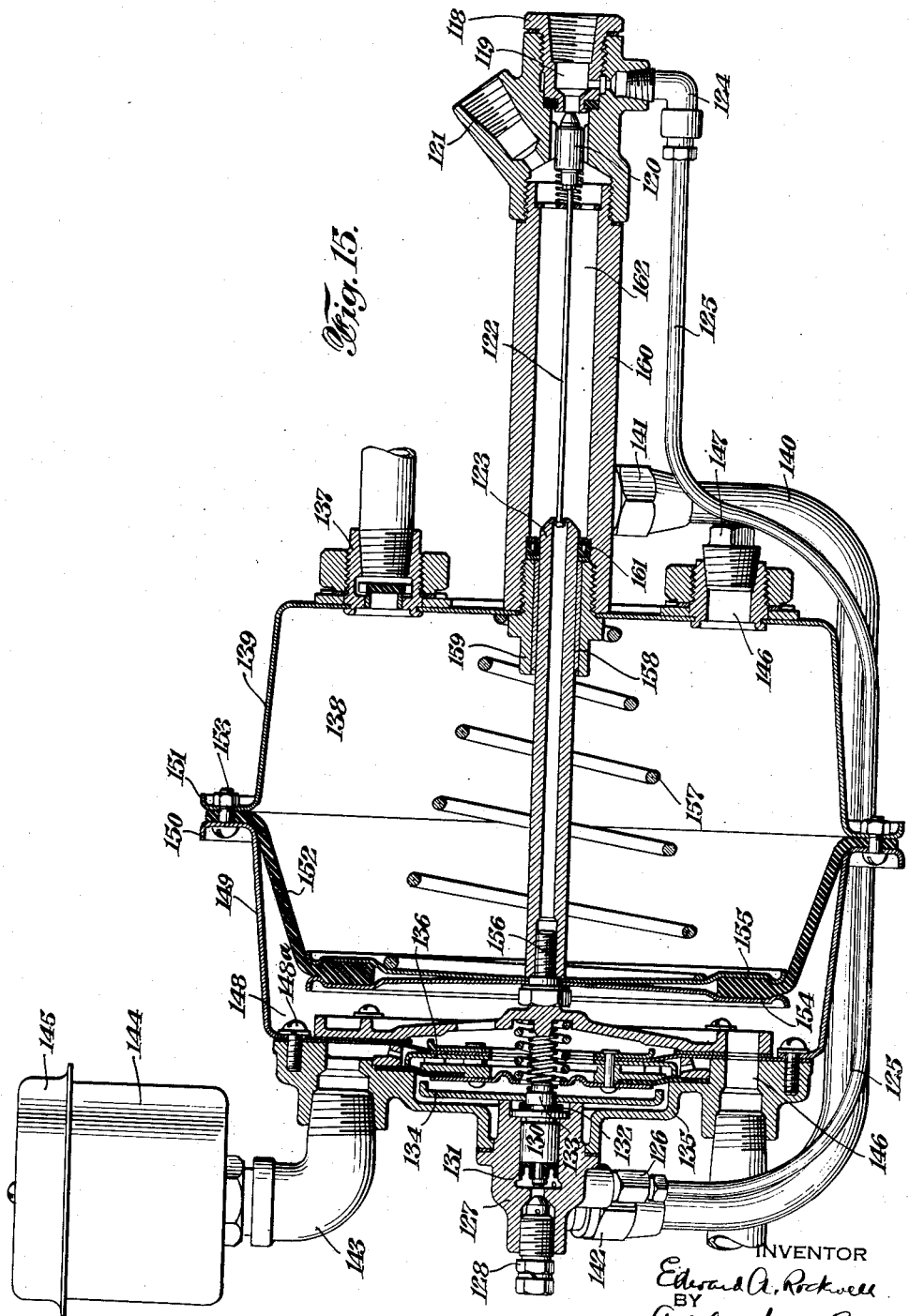

Dec. 22, 1942.  E. A. ROCKWELL  2,305,638
HYDRAULIC BRAKE TRAILER SYSTEM
Filed June 13, 1941   8 Sheets-Sheet 8
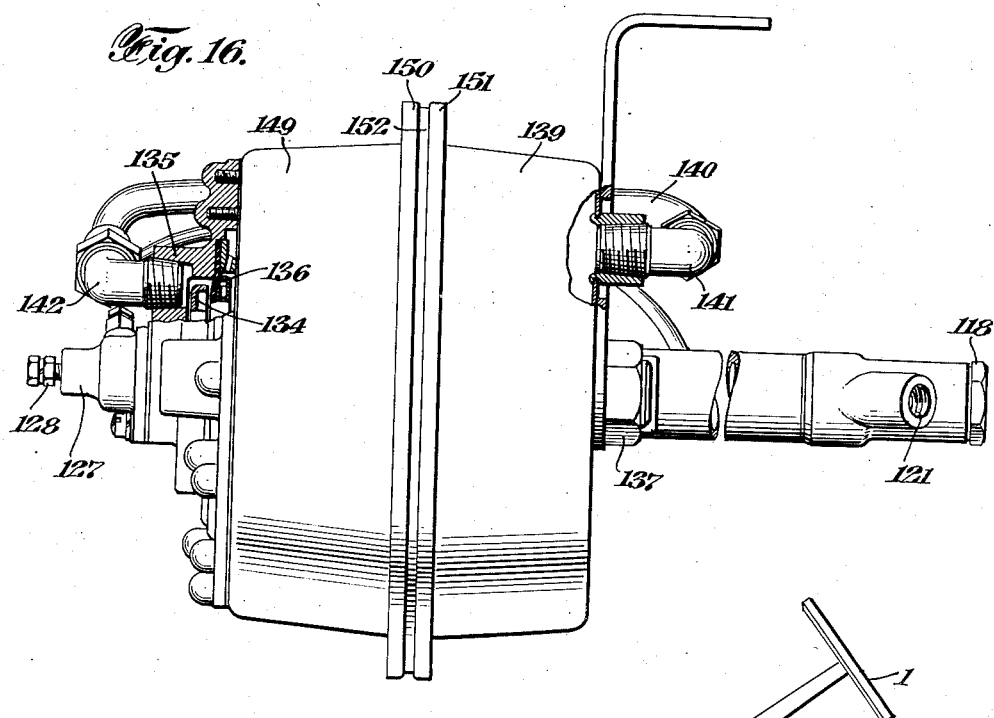
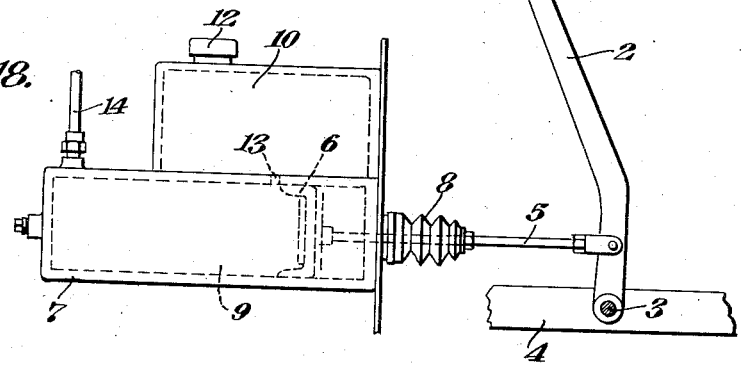
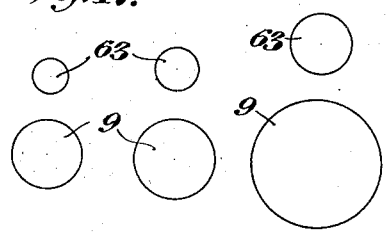
INVENTOR
Edward A. Rockwell
BY
Arthur Wright
ATTORNEY Patented Dec. 22, 1942

2,305,638

UNITED STATES PATENT OFFICE 2,305,638

HYDRAULIC BRAKE TRAILER SYSTEM

Edward A. Rockwell, West Hartford, Conn.

Application June 13, 1941, Serial No. 397,899

19 Claims. (Cl. 188—3)

My invention relates particularly to a system for the operation of brakes on trailers, which is adapted to be used with automotive vehicles generally but has particular application to trailers operated in connection with trucks.

The object of my invention is to provide a trailer brake system adapted to give exceptional performance and speed of action. A further object is to provide a system capable of being adapted for the operation of any dual-line vacuum trailer equipment. Another object is to provide a system which is capable of operation with one or more of the power units disclosed in my copending application upon Power unit apparatus, Ser. No. 343,754, filed July 3, 1940. Again, a further object is to provide trailer connections giving exceptional performance and which, if accidentally broken away, will automatically apply the brakes of the trailer when the latter breaks away. Furthermore, the object is to provide connections whereby a system on the trailer itself can be operated from the power unit of said copending application. This is particularly advantageous when using one of said power units and a power-operated master cylinder on the trailer. I have also provided equipment for operating trailer brakes without requiring the presence of relay valves. The system made in accordance with my invention is, furthermore, arranged to be interchangeable with different types of known systems applied to trailers. Further objects of my invention will appear from the detailed description of the same hereinafter.

While my invention is capable of embodiment in many different forms for the purpose of illustration I have shown only certain forms thereof in the accompanying drawings, in which—

Fig. 5 is a plan view of the same;

Fig. 6 is a vertical section taken on line 6—6 of Fig. 4;

Fig. 7 is an end view of the adapter used in Fig. 4;

Fig. 8 is a longitudinal section of a brake-away valve used in connection with both forms of my invention shown in Figs. 1 and 2;

Fig. 9 is an end elevation of the power unit used on the main vehicle;

Fig. 10 is an end elevation taken at the other end of the same;

Fig. 11 is a longitudinal vertical section taken on line 11—11 of Fig. 9;

Fig. 12 is a plan view partly in section, taken on line 12—12 of Fig. 9;

Fig. 13 is an end elevation of a modified form of said power unit, which may be used instead of the power unit shown in Figs. 9 to 12 and which is preferably used as part of the installation on the trailer;

Fig. 14 is an elevation taken at the other end of said power unit in Fig. 13;

Fig. 15 is a vertical section of the power unit taken on line 15—15 of Fig. 13;

Fig. 16 is a plan view partly in section, taken on line 16—16 of Fig. 13;

Fig. 17 is a diagrammatic view showing the relative sizes of the power unit plungers used with the respective sizes of the master cylinder pistons; and Fig. 18 is an elevation of the pedal and master cylinder used in connection with Figs. 1 and 2.

Figure 4:
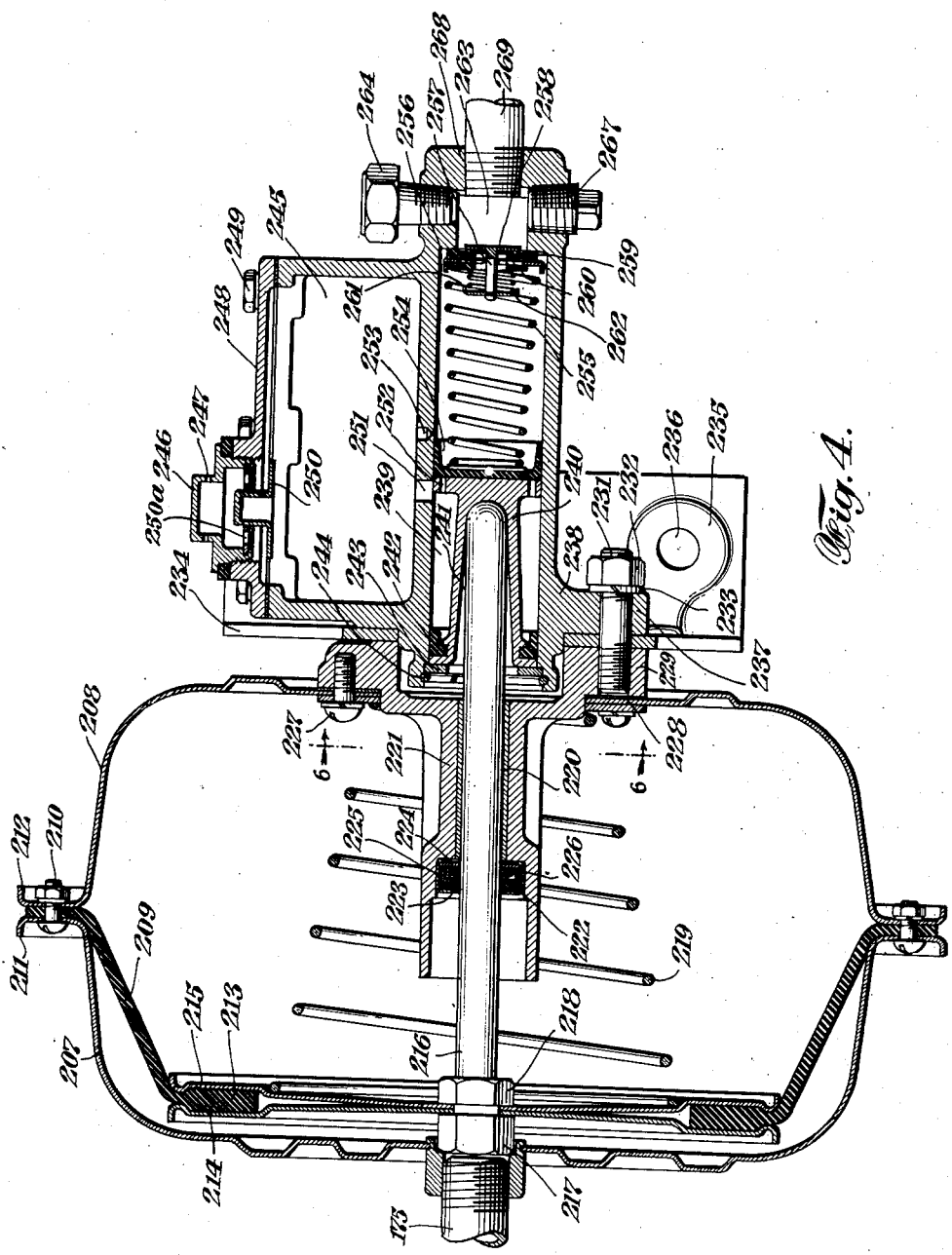
Fig. 4 is a vertical section of the same taken on line 4—4 of Fig. 3.

Referring to the first form of my invention shown in Figs. 1, 9 to 12 and 18, I have shown a pedal 1 mounted on a lever 2 which is pivoted on a shaft 3 carried by a chassis 4 of an automobile. A link 5 is attached to said lever 2 intermediate its ends so as to give any desired pedal ratio movement of the pedal 1 to the brake-operating link 5. The said link 5 is pivotally connected to a piston 6 of a master cylinder 7 and which may be of any desired form, as for example of the type disclosed on the patent to Loughead, No. 1,707,063, granted March 26, 1929, or as shown in Fig. 4 hereof. The link 5 passes into the master cylinder through a collapsible rubber boot 8 so as to operate said piston 6 in a cylinder 9 beneath a storage chamber 10 having a vent 11 in a filler opening 12, the liquid being accessible to the chamber 9 through an opening 13 in the retracted position of the piston 6. When the pedal 1 is moved downwardly the piston 6 is adapted to discharge the liquid of the master cylinder from a pipe 14 to an inlet opening 15 located in a removable fitting 16 screw-threaded in a casting 17 at one end of the power unit, Fig. 11. The fitting 16 carries on its inner face a rubber seal 18 and the liquid from the fitting 16 is conveyed by a port 19 therein to a valve passageway 20 having a plurality of longitudinal channels 21 therein so as to communicate with a chamber 22 in said casting and thence initially to convey the liquid under manual pressure by a passageway 23 to an outlet port 24 which serves the purpose of delivering modulated hydraulic pressure manually, or from the power apparatus hereinafter described, to the accessory to be operated, as for instance the wheel brakes of the automobile having the usual wheel brake cylinders for operating the brake shoes, for example as disclosed in my application aforesaid. It will be noted that the said casting 17 carries additional alternative outlet ports 25 and 26 constructed the same as the outlet port 24 except that they are located at different angles so that any one of them may be connected in the most convenient way to the line leading to the accessory to be operated. Furthermore, the said casting 17 supports an end cover 26a secured to an outer shell 27 enclosing the parts of the power unit, by means of screws 28, the said shell 27 being supported in any desired manner, by straps 29 and 30 secured together by bolts 31, spacing sleeves 32, nuts 33 and lock washers 34, on the automobile chassis. Adjacent to the casting 17 there is provided a vacuum inlet fitting 35 which contains a check valve 36, within a valve chamber 37 therein, adapted to seat against a bushing 38. In this way the vacuum, as for example by a pipe 38a from an engine manifold 38b or any other desired source, is supplied to the interior of the shell 27. Opposite to the vacuum inlet fitting 35 there is a vacuum trailer connection 39. The hydraulic liquid received from the line 14 also passes from the inlet opening 15 through a passageway 43 in the casting 17 and thence by a pipe 44 into an opening 45 in a valve casing 46 into which there is screw-threaded a fitting 47 for a pipe 48 which is connected by an angular pipe 49 into the side of a plunger housing 50 so as to communicate with a chamber 51 therein. The said chamber 51 also communicates with a passageway 52 adjacent to a valve seat 53 provided for receiving a conical end 54 of a bleeder valve 55 screw-threaded into the plunger housing 50. A plurality of transverse ports 56 extend through the reduced end of the bleeder valve 55 so as to communicate with a longitudinal passageway 57 in the bleeder valve, which is normally closed by a screw plug 58 held in position by a lock washer 59. When the plug 58 is removed and the valve 55 unscrewed to unseat the bleeder valve, the accumulated air is relieved through the passageway 57. The said plunger housing 50 supports in place a cover plate 60 by means of a nut 61, the periphery of which rests upon a plurality of teeth 62 on the valve casing 46. The hydraulic liquid in the chamber 51 thus communicates with one face of a cylindrical plunger 63 having a rubber seal 64 on a reduced end thereof. As will be seen in Fig. 17, the plunger 63 may be made in several different sizes so as to be capable of being substituted in the apparatus with an appropriate size of plunger housing 50 so that by the increase in the area of the plunger 63 the power unit can be adapted to the operation of larger and heavier vehicles, such as trucks, in which a large volume of liquid is required for operating the wheel brakes thereon. In this Fig. 17 there are illustrated, by way of example, three diameters of the plungers 63 with the relative diameters of the master cylinder pistons used therewith, it being understood that the pedal lever ratio for each set of diameters will be adjusted therewith to always obtain approximately the same ratio of force from the piston 9 to the force obtained from its plunger 63 in each of the three pairs of pistons and plungers. Unless this reduced area of the plunger 63, as compared with the master cylinder piston, were used the liquid from the master cylinder would be used up faster than desirable in obtaining an effective control. The other end of the plunger 63 carries a gasket 65 adjacent to a reduced end 66 thereon. It will be noted that the plunger housing 50 fits within and is fastened to the valve casing 46 by screws 67 and one end of the plunger housing 50 acts as a stop or support for an outlet valve 68 which is attached to the reduced end 66 of said plunger 63. The outlet valve 68 is arranged for movement within a chamber 69 in the valve casing 46, which communicates with a passageway 70 in the valve casing 46 and which passes through a supporting ring 71 fastened to one end of the outer shell 27 and to the valve casing 46 by screws 71a, thus giving access of the vacuum within the shell 27 to the outlet valve chamber 69. When the plunger 63 is moved forwardly by the liquid in the chamber 51 this causes the outlet valve 68 to seat against a diaphragm 72 of rubber or other suitable material, which is clamped at its periphery against one face of the valve casing 46 by a ring 73 having ports 74 therein. These ports 74 permit the passage of atmospheric air pressure to be received in the apparatus from a passageway 75 covered by a screen 76 which communicates with a chamber 77 filled with horse-hair and which is open to the air through the teeth 62 and the other periphery of the cover 60 spaced from the valve casing 46, as shown in Fig. 11. This atmospheric air is adapted, when the outlet valve 68 is seated, to enter beneath the periphery of an inlet valve 78 which is normally seated on one face of the said diaphragm 72. This inlet valve 78 is supported on the inner periphery of a thin oxidized oil woven fabric ring 79 backed by a paper gasket 79a, which latter is held in position against one face of the valve casing 46 by means of a clamping plate 80 and screws 81. Furthermore, the said inlet valve 78 is clamped in position on the ring 79 by a clamping ring 82 and rivets 83 which pass not only through the inlet valve 78 but also through a ring 84 and a spring-supporting ring 85 which is clamped thereby against one face of the diaphragm 72. It will be noted, also, that there are passageways 86 which pass radially from the outer portion of the inlet valve 78 inwardly to the inside of the ring 84 so as to communicate with a chamber 87 located beneath the outlet valve 68. In this chamber 87 there is a spring 88 supported at one end upon the ring 85 and at the other end upon the clamping plate 80 to normally force the inlet valve 78 to the left in Fig. 11. Also within the chamber 87 there is an inner spring 89, one end of which is seated on the said clamping plate 80 and the other end of which surrounds a small extension on the end of the plunger 63. The clamping plate 80 has perforations 90 through the same to permit the passage of the vacuum or air received in the chamber 87. Also passing through the clamping ring 80 and the valve casing 46 there is a passageway 91 for supplying modulated pressure for a trailer connection, also as an opening for the insertion of a lubricant. When the outlet valve 68 has been closed and the inlet valve 78 opened, the pressure of the atmospheric air is then received on one face of a piston 93 so as to move the same. This piston carries on one face a clamping disc 94 for holding in place a leather gasket 95, of right-angle cross-section, which is held outwardly against the inner face of a cylinder 96 by a spring ring 97 which is in the form merely of a succession of shapes of a right-angle S with flat portions facing the leather gasket 95 outwardly. The cylinder 96 is supported in place within the inner periphery of the supporting ring 71. On the other face of the piston 93 there is a plate 98 for holding in place a felt ring 99 which also bears on the inner periphery of the cylinder 96. The said plate 98 has a circular off-set portion 100 around a plunger 101 on which both of the plates 94 and 98 are fastened by a screw 102. Within the plunger 101 there is provided a longitudinal passageway 103 for receiving a flanged end 104 of a rod 105 of small diameter, and said plunger 101 is supported for reciprocation within a bushing 106 located in a cylindrical fitting 107 screw-threaded into a pressure cylinder 108, which latter carries a disc 109, having perforations 110, to act as a support for the cylinder 96 and also for one end of a helical spring 111, the other end of which is supported on the face of the plate 98. This spring is made stiff enough so that the piston 93 will not be moved until the brake shoes have been moved into position manually, even through the valve 78 may have admitted some air, which modulated air pressure will have already begun to operate the trailer brakes by power. There is also provided on the outside of the cylinder 108 and against the face of the disc 109, a triangular spider-ring 112 having three ears 112a to receive screws 112b provided with spacing-keepers 112c and nuts 112d so as to effectively clamp the disc 109 to the cylinder 96. Within the end of the piston 101 there is an annular shoulder 113, so that when the piston 93 is moved to the extreme left, in Fig. 11, the shoulder 113 contacts with the flange 104 so as to pull a valve member 114, screw-threaded to the other end of the rod 105, off its seat on the inlet fitting 16. A spring 115 around a reduced end of the valve 114, and which is supported at the other end of the spring upon a spider 116 carried on a shoulder 117 in the cylinder 108, serving to hold the spring 111 partly compressed in the assembly of the parts so that all these connected parts can be inserted as a whole in the container 27, normally forces the valve 114 against its seat when not pulled away from the seat by the shoulder 113.

As an alternative power unit to the power unit just described I may use, instead, the modified form of power unit shown in Figs. 13 to 16. This alternative form of the power unit is provided with the same connections to the master cylinder, wheel brakes and vacuum as in the form of the power unit shown in the preceding figures. For this purpose there is provided an inlet fitting 118 for the liquid from the master cylinder, which communicates with a valved passageway 119 having a spring-pressed valve 120 therein arranged to supply modulated hydraulic pressure to the wheel brakes from a port 121, also a rod 122 and a plunger 123, all of these parts being constructed substantially the same as in the form shown in the preceding figures. In this instance, however, the manual pressure liquid from the master cylinder, for applying the increased power, passes through an elbow 124 and thence through a pipe 125 to a fitting 126 in a plunger housing 127 having a bleeder valve 128 therein constructed the same as the bleeder valve 54, previously described. The bleeder valve 128 is carried in the plunger housing 127 in which there is located a plunger 130 adapted to be moved by the hydraulic pressure from the pipe 125. Both the plunger 130 and the plunger housing 127 may be substituted by one or more plungers of larger diameter and with the appropriate housing therefor, as previously described in connection with the preceding figures. The plunger 130 has a rubber seal 131 on one face and a rubber gasket 132 on the other face and said plunger 130, furthermore, has a reduced end 133 to which there is fastened an outlet valve 134 in a valve casing 135 containing an inlet valve 136, the valves 134 and 136 being supported and constructed the same as in the form of the invention described in connection with the preceding figures. In this instance, however, the vacuum is received through a check valved fitting 137 into a vacuum chamber 138 within a dished casing 139 and is thence conveyed outside of said casing by a pipe 140 from an elbow 141 on the dished casing 139 and thence to an elbow 142 on the valve casing 135, so as to admit vacuum thereto. The atmospheric air pressure is admitted to the outside of the inlet valve 136 from a right-angle pipe 143 leading from a breather chamber 144 filled with horse-hair and carrying a peripherally vented cover plate 145. Opposite to the pipe 143 the valve casing 135 carries an opening 146 for supplying modulated pressure to a trailer or any other purpose. The air pressure, after being admitted by the seating of the valve 134 and unseating of the valve 136, enters a chamber 148 formed by a dished casing 149 secured by screws 149a to the valve casing 135 and having an annular flange 150 adapted to be clamped to an annular flange 151 on the dished casing 139 so as to support a flexible wall 152 of rubber or other material between said flange by means of screws 153. The said wall 152 is in the form of a ring, the inner periphery of which is clamped between plates 154 and 155 and on to the plunger 123. Around the plunger 123 there is a helical spring 157, one end of which is seated against the plate 155 and the other end against the dished casing 139. A bushing 158 supports the free end of the plunger 123 and said bushing is carried within a sleeve 159 clamped to the dished casing 139 by a cylinder 160 screw-threaded onto said sleeve 159. A rubber seal 161, within the cylinder 160, provides a sealed pressure chamber 162 from which the liquid is supplied to the wheel brakes through the passageway 121 when the power is being applied by the force of the plunger 123 to the right, in Fig. 15. It will be understood that in carrying out this operation, the rod 122 and the valve 120, which is supported in the same manner as in the form of the invention shown in Figs. 9 to 12, carries out the action in the same way as in said Figs. 9 to 12.

In the case of either one of said power units, the same is connected by a pipe 163 to a three-way valve 164 operated by a hand lever 165 and having three ports 166, 167 and 168 so as to either connect the ports 166 and 168 to the pipe 163 and a pipe 169 or so as to close the port 166 and connect the port 168 and vent 167 with the pipe 169 in order to regulate the venting of the port 168. This is arranged so that trailer brakes may be operated alone, when desired, when going down grade, by operating the hand lever 165 to bring the ports 168 and 167 into communication with the pipe 169. Said pipe 169 also leads to a hand valve 171 which is designed to cut off the flow through said pipe when no trailer is being used. From this hand valve 171 a flexible tube 172 leads to a coupling 173 on a trailer chassis 174 where said coupling is attached to a flexible pipe 175 communicating with the rear end of a cylinder 176 having a piston 177 therein connected by a rod 178 passing through a rubber boot 179 to an arm 180 on a brake shaft 181 connected by arms 182 and links 183 to any usual mechanism for operating brake shoes on wheel brakes 184. It will be noted that the cylinder 176 need not be provided with any valves and, as a matter of fact, this may be any usual type of dual-line operating brake actuating cylinder. In this instance it is comprised of a cylindrical wall 185 having heads 186 and 187 clamped together with bolts 188 which secure the cylinder to the trailer chassis 174 by means of brackets 189 and 190. The head 187 receives the end of the pipe 175 and the head 186 receives a vacuum pipe 191 which is smaller in diameter than the pipe 175. The pipe 175 is relatively large in diameter so that there will not be any delay in the application of the atmospheric air through said pipe to the rear face of the piston 177, so that the brakes 184 will become set and receive at least some braking force when the manual force is being applied directly through the ports 19, 21 and 23 to set the brakes on the main vehicle. However, the pipe 191 is relatively small in diameter so as to give an appreciable lag in the releasing of the braking force on the trailer brakes 184 during the release of braking force by the piston 93 to the brakes of the main vehicle. This pipe 191 is connected by a valve coupling 192 which contains therein a helical spring 193 to normally open a valve 194 against which it rests, having a gasket 195 which seats on the end of the valve coupling 192. The valve 194 is adapted to move within a cylindrical valve housing 196 and has a longitudinal channel 197 to restrict the flow of vacuum communicating with a port 198 which passes transversely into a chamber 199 in the valve 194 communicating with a passageway 200 leading to an angle-fitting 201 having a coupling 202 which, in case of accident, is arranged to break the same as the coupling 173. The coupling 202 is connected by a flexible tube 203 leading to a hand valve 204 constructed like the hand valve 171 which in turn communicates by a pipe 205 to the opening 39 on the power unit.

Figure 1:
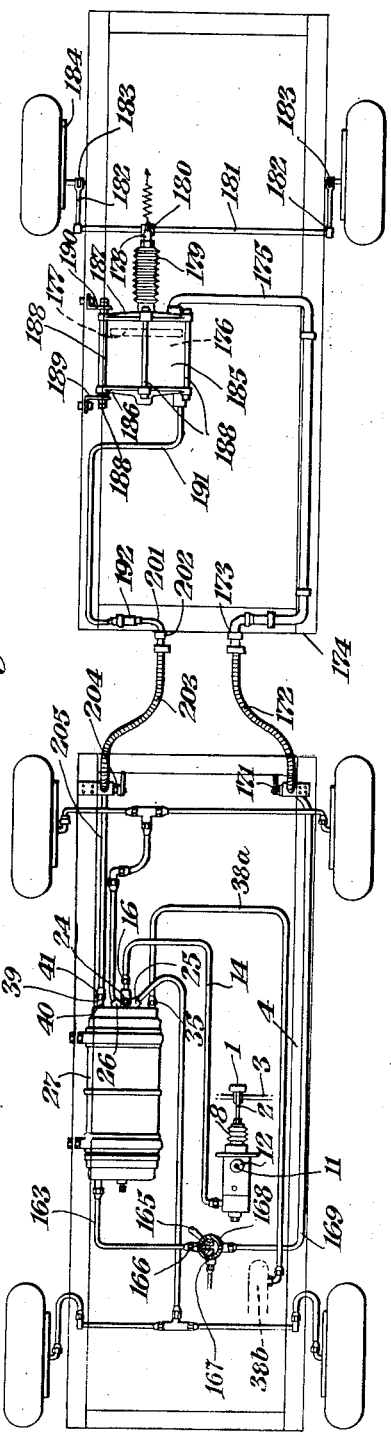
Fig. 1 is a schematic plan view of the simpler form of my invention as applied to a main vehicle and trailer connected thereto.
Figure 2:
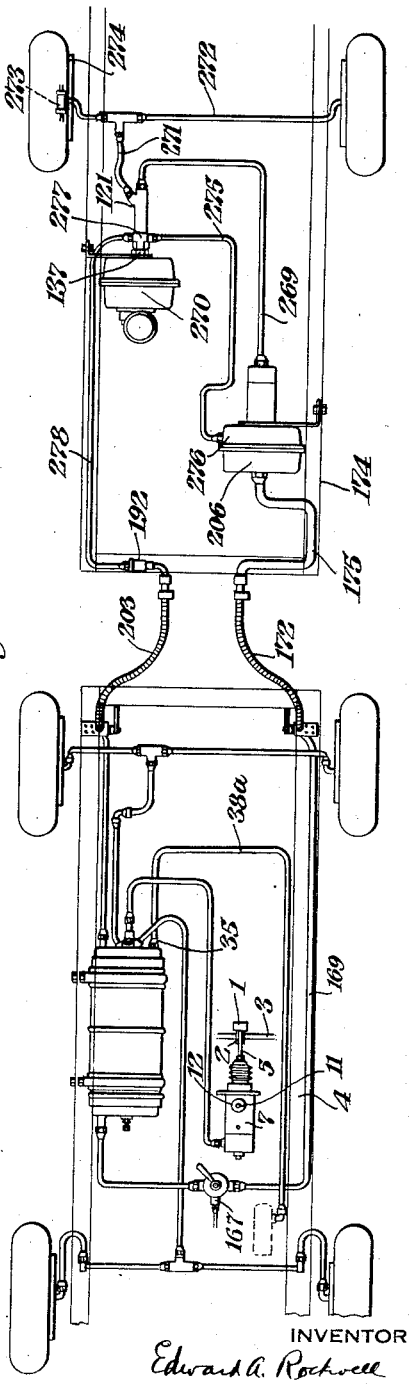
Fig. 2 is a schematic plan view of a modified form of the system in which one of my power units, as set forth in the application aforesaid, is mounted on the trailer.
Figure 3:
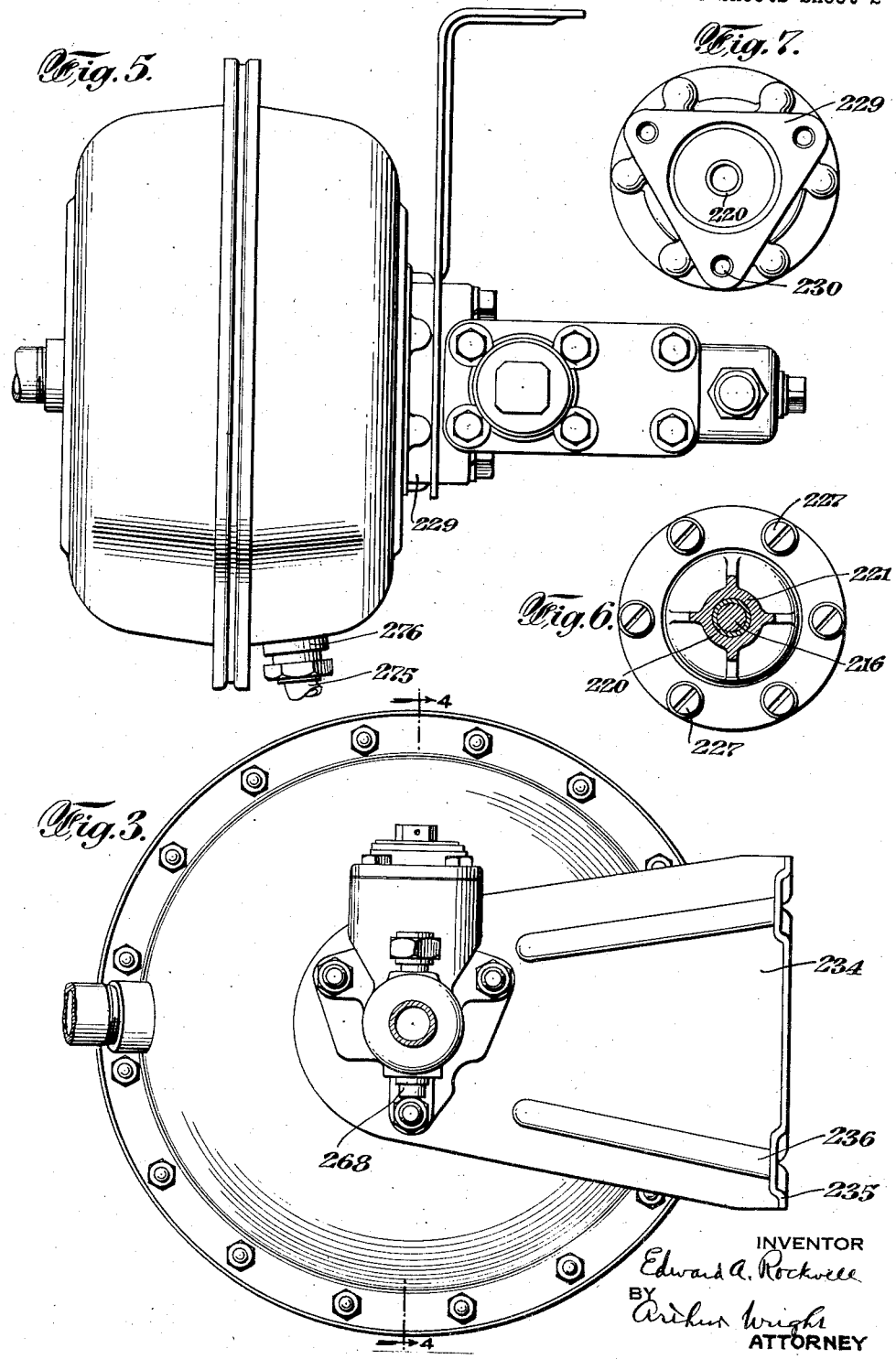
Fig. 3 is an end elevation of the power unit actuator used in connection with the modification shown in Fig. 2.

The modified form of installation shown in Fig. 2 is installed on the main vehicle 4 in the same way as described in connection with the installation in Fig. 1, and the connections with the trailer chassis 174 are the same. The pipe 175 in this instance, however, leads to a power actuator 206 which in effect takes the place of the foot for the actuation of the master cylinder for the application of the brakes. This power actuator is comprised of a forward shell 207 and a rear shell 208 clamping between them a flexible rubber diaphragm 209 by means of bolts 210 passing through flanges 211 and 212 on said two shells. The diaphragm 209 has a thick inner periphery 213 which is clamped between two spring plates 214 and 215 secured on a plunger 216 by means of nuts 217 and 218. The plate 215 serves as the end support also for a helical spring 219, the other end of which rests against the shell 208. The plunger 216 extends into a bushing 220 within a cylindrical casting 221 within which it is sealed by means of a sealing ring 222 of right angle cross section, carried within a ring housing 223 U-shaped in cross section loosely carried over the plunger 216. The sealing ring 222 is held firmly within the ring housing 223 by means of an end ring 224 and an angle ring 225 having a coil spring ring 226 between the same. The cylindrical casting 221 is secured to the shell 208 by screws 227 having an interventing gasket 228. The casting 221, furthermore, serves as an adapter as it has a triangular face 229 provided with three screw holes 230 for receiving screws 231 having nuts 232 and lock washers 233 for holding the actuator on a bracket 234 adapted to be secured to the chassis 174 of the trailer by means of a flange 235 and screw holes 236. Also, said screws 231 pass through ears 237 on a master cylinder 238. Said master cylinder 238 has a hydraulic cylinder 239 in which a piston 240 moves, provided with a recess 241 to receive the plunger 216, said piston 240 having a rubber seal 242 and said cylinder 239 having a ring 243 therein to act as a stop, held in place by a split ring 244. Above the cylinder 239 the master cylinder has the usual reservoir 245 and screw cap 246 as well as a vent 247, supported within a cover 248, and located between the said cap 246 and cover 248, secured in place by screws 249, there is a baffle 250 supported by a perforated ring 250a to prevent splashing. A port 251 makes a free connection between the reservoir 245 and the rear face of the piston 240, which also has transverse ports 252 to permit the movement of oil to the right while the piston 240 is being retracted. Before the piston 240 is being moved forwardly to the right oil enters by a port 253 from the reservoir 245 to the piston face. A rubber piston ring 254 is carried on the face of the piston 240 against which it is held by a helical spring 255, the other end of said spring being supported by a dished spring ring 256 which acts as a guide for a check valve 257 provided with a disc 258 which seats on a rubber ring 259 on one side of the retainer ring 256, the other side of said ring having a rubber ring 260 to support a small helical spring 261 carried by a retainer ring 262 mounted on the stem of the valve 257. At the end of the cylinder 239 beyond the valve 257 there is a chamber 263 having a screw plug 264, also a drain port 267 and an outlet port 268, which always retains a slight pressure, to connect the master cylinder to a flexible pipe 269 leading to the inlet port 118 of a power unit 270 constructed like the power unit described in detail in connection with Figs. 13 to 16, and which is free from thrust with regard to the trailer chassis in the operation of the power unit and the operation of the trailer brakes from the power unit. The outlet or delivery opening 121 on this power unit leads by a flexible tube 271 to a pipe 272 provided for operating brake cylinders 273 and wheel brakes 274 on the trailer. A flexible vacuum pipe 275 leads from a port 276 to a three-way fitting 277, the lateral port of which is connected to the check valve port 137 on the unit 270. Another branch of said fitting 277 goes to a flexible pipe 278 smaller in diameter than the pipe 175, which leads to the break-away valve 192.

In the operation of the trailer system, referring first to the form of the installation contained in Fig. 1, when the trailer is connected to the main vehicle and the valves 171 and 204 are open, the valve 164 is ordinarily kept in the position communicating with the pipe 169 and disconnected from the vent 167. At this time the vacuum is equalized in the power unit 27 and on both sides of the piston 177 and the brakes are fully released. Under these circumstances, when the pedal 1 is operated the liquid, under the manual pressure, will proceed directly from the pipe 14 through the outlet 24 so as to initially apply the manual force to force said brake shoes to move until they are in snug position on the respective brake drums. Any increase of the manually applied pressure above this point will result in moving the piston 93 so as to close the direct connection between the ports 15 and 24 and deliver magnified pressure due to the application of the air to one side of the piston 93 as against the vacuum on the other side thereof through the port 24 to the front and rear wheel brakes. If the vehicle is approaching a decline in a road or it is desired to apply the brakes on the trailer, the hand valve 165 will be in the position with the vent 167 disconnected from the pipe 163 and, instead, there is a connection between the pipe 169 and the vent 167. However, due to the stiff spring 111, even before the main vehicle brakes are moved into the position where the brakes are set by the manual force, the trailer brakes will have been set and have some power applied thereto owing to the admission of some air through the pipe 172. Under these conditions, when the manual pressure is being applied initially by the operation of the pedal 1 to set the brakes on the main vehicle, the pipes 169 and 175 will quickly admit atmospheric air to the rear face of the piston 177 and the vacuum will have been applied to the front face thereof through the small pipe 191 and restricted channel 197. However, the valve 187 will not become seated under the influence of small variations in the vacuum, owing to the spring 193. Upon the further application of the manual pressure from the pedal 1 the increase of pressure will move the piston 93 in the power unit to close the direct connection between the inlet port 14 and the outlet port 24 so as to thereafter apply the magnified pressure by the movement of the piston 93 to the wheel brakes on the main vehicle and the braking effort on the trailer brakes 184 will continue in the same manner inasmuch as the movement of the piston 93 in this manner is produced by any desired differential between the admitted atmosphere and vacuum determined by the position of the pedal 1, and this differential will be effective, likewise, on the piston 177. When the trailer brakes alone are to be used the hand lever 165 on the three-way valve 164 will be moved manually to control the trailer brakes by closing off the modulated air from the pipe 163 to the pipe 169 and admitting air to the pipe 169 in controlled amounts from the vent 170. In case of the trailer, for any reason, breaking away from the main vehicle this breakage will occur in the flexible tubes 172 and 203 or in the coupling 173 and 202, whereupon atmospheric air pressure will be present in the pipe 175 and the vacuum will be trapped in the cylinder 185 by the sudden closing of the valve 184 so that automatically the trailer brakes will suddenly be moved into full braking position so as to bring the trailer to rest. If the trailer is not present, of course, the valves 171 and 204 will be kept closed.

The operation of the modification of my invention shown in Figs. 2, 3 to 7 and 13 to 16 will take place in substantially the same manner as described in connection with Fig. 1, at least so far as the operation of the parts on the main vehicle is concerned. However, in this instance the atmospheric air pressure from the power unit on the main vehicle is conveyed to the actuator 206 and the modulated action of this air pressure, brought about by the movement of the pedal 1, will coordinately move the diaphragm 209 so as to move the master cylinder piston 240 forwardly coordinately, and convey the hydraulic liquid therefrom by the pipe 269 to the power unit 270 according to the initial manual pressures applied by the pedal 1, while said manual pressures are going directly to the front and rear wheel brakes of the main vehicle through the ports 14 and 24. Similarly, the liquid under this manual pressure will pass directly from the port 118 to the pipe 271 and thence to the brake cylinders 273 to set the brakes in snug position. Further increase of the pressure from the pedal 1 will close the direct communication between the ports 15 and 24 and cause the piston 93 to move so as to discharge the liquid under the magnified pressure received from the piston 93 to the front and rear brakes of the main vehicle and in the same way the liquid from the pipe 269 will no longer pass directly to the pipe 271 but the valve 120 will become closed and thereafter the magnified pressure produced by the movement of the diaphragm 152 and the plunger 123 connected thereto will force the liquid under this magnified pressure according to the position of the pedal 1, into the brake cylinders 273 to operate the trailer brakes 274. As in the case of the form of my invention described in connection with Fig. 1, in case of breakage in this modification, of the lines 172 and 203, the pipe 175 will be fully open to the air and the vacuum pipe 278 will trap the vacuum therein due to the closure of the valve 184, thereby suddenly putting the full force of the differential between the air and the vacuum on the actuator diaphragm 209 so as to apply the hydraulic liquid from the pipe 269 at high pressure to close the valve 120 and, therefore, apply the magnified pressure from the diaphragm 152 and plunger 123 to the said wheel brake cylinders 273. The system of operation of the trailer brakes in this instance is substantially the same as the operation of the brakes on the main vehicle except on the trailer the brake operation is initiated by the power operated master cylinder 238, instead of the mechanically operated master cylinder shown in Fig. 18.

While I have described my invention above in detail I wish it to be understood that many changes may be made therein without departing from the spirit of the same.

I claim:

1. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, the pipe which conveys the pressure not subjected to manual control comprising a relatively restricted means for impeding the flow of the fluid therethrough.

2. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, said power-applying device comprising a movable wall subject to operation by said pressures without control by valves between said power-applying device and the pressure lines connected thereto, the pipe which conveys the pressure not subjected to manual control comprising a relatively restricted means for impeding the flow of the fluid therethrough.

3. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, the pipe which conveys the pressure not subjected to manual control including a check valve with a small port adapted to be mounted on the trailer, for impeding the flow of the fluid through said valve when unseated.

4. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, said power-applying device comprising a movable wall subject to operation by said pressures without control by valves between said power-applying device and the pressure lines connected thereto, the pipe which conveys the pressure not subjected to manual control including a valve with a small port, adapted to be mounted on the trailer, for impeding the flow of the fluid through said valve when unseated.

5. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, the pipe which conveys the pressure not subjected to manual control including a check valve with a small port and break-away connection for impeding the flow of the fluid through said valve when unseated.

6. In combination, a power unit adapted to be applied to a main vehicle for the operation of brakes thereon, sources of two different pressures for operating said power unit, pipes leading from said power unit, a power-applying device adapted to be located at a trailer connected to said vehicle and connected to said pipes, and manual means for controlling one of said pressures for the operation of the power unit and power-applying device, said power-applying device comprising a movable wall subject to operation by said pressures without intervening valves, the pipe which conveys the pressure not subjected to manual control including a valve with a small port and break-away connection for impeding the flow of the fluid through said valve when unseated.

7. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, the pipe which conveys the pressure not subjected to manual control including a valve and a pipe smaller in diameter than the pipe for the other pressure for impeding the flow of the fluid through said valve when unseated.

8. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, said power-applying device comprising a movable wall subject to operation by said pressures without intervening valves, the pipe which conveys the pressure not subjected to manual control comprising a relatively small-diameter pipe for impeding the flow of the fluid therethrough.

9. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means, comprising a hydraulic connection, for controlling one of said pressures for the operation of the power unit and power-applying device, said power unit having pressure magnifying elements therein.

10. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means, comprising a hydraulic connection, for controlling one of said pressure for the operation of the power unit and power-applying device, said power-applying device comprising a movable wall subject to operation by said pressures without control by valves between said power-applying device and the pressure lines connected thereto, said power unit having pressure magnifying elements therein.

11. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, said power-applying device comprising a second power unit provided with pressure magnifying elements.

12. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, manual means for controlling one of said pressures for the operation of the power unit and power-applying device, said power-applying device comprising a second power unit provided with pressure magnifying elements, and a fluid-operated power actuator adapted to be mounted on the trailer, connected for operation with the pipe containing a manually variable pressure and having a hydraulic connection from the actuator to said second power unit for operating the latter.

13. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, manual means for controlling one of said pressures for the operation of the power unit and power-applying device, said power-applying device comprising a second power unit provided with pressure magnifying elements, and a fluid operated power actuator, comprising a movable wall and piston moved thereby, adapted to be mounted on the trailer, connected for operation with the pipe containing a manually variable pressure and having a hydraulic connection from the actuator to said second power unit for operating the latter.

14. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, manual means for controlling one of said pressures for the operation of the power unit and power-applying device, said power-applying device comprising a second power unit provided with pressure magnifying elements, and a fluid-operated power actuator, comprising a movable wall and a master cylinder containing a piston moved thereby, adapted to be mounted on the trailer, connected for operation with the pipe containing a manually variable pressure and having a hydraulic connection from the actuator to said second power unit for operating the latter.

15. In combination, a power unit adapted to be applied to a main vehicle for the operation of brakes thereon, sources of two different pressures for operating said power unit, pipes leading from said power unit, a power-applying device adapted to be located on a trailer connected to said vehicle and connected to said pipes, and manual means for controlling one of said pressures for the operation of the power unit and power-applying device, said power-applying device comprising a movable wall subject to normal operation by said pressures and a stiff spring associated with said wall for delaying the movement of said wall.

16. In combination, a manually operated hydraulic line, an automotive accessory operatively connected to said line, a pneumatic motor connected to be operated by said line, a pressure increasing device connected to said motor, a valve operated as a result of the increase of pressure in said line so as to cut off the manual pressure to the accessory by the movement of said motor, and a trailer accessory-operating device connected to receive a pneumatic pressure from said motor.

17. In combination, a manually operated hydraulic line, an automotive accessory operatively connected to said line, a pneumatic motor connected to be operated by said line, including sources of two different pressures and a movable wall operated thereby, a pressure increasing device connected to said motor, a valve operated as a result of the increase of pressure in said line so as to cut off the manual pressure to the accessory by the movement of said motor, and a trailer accessory-operating device, including a movable wall, connected to receive a pneumatic pressure from said motor.

18. In combination, a manually operated hydraulic line, an automotive accessory operatively connected to said line, a pneumatic motor connected to be operated by said line, including sources of two different pressures and a movable wall operated thereby, a pressure increasing device connected to said motor, a valve operated as a result of the increase of pressure in said line so as to cut off the manual pressure to the accessory by the movement of said motor, and a trailer accessory-operating device, including a power unit and a master cylinder for operating said power unit, connected to receive a pneumatic pressure from said motor.

19. In combination, a manually operated hydraulic line, an automotive accessory operatively connected to said line, a pneumatic motor connected to be operated by said line, including sources of two different pressures and a movable wall operated thereby, a pressure increasing device connected to said motor, a valve operated as a result of the increase of pressure in said line so as to cut off the manual pressure to the accessory by the movement of said motor, and a trailer accessory-operating device, including a power unit and a master cylinder for operating said power unit, connected to receive a pneumatic pressure from said motor, said power unit being constructed to be mountable on a trailer chassis without thrust therefrom with relation to the chassis in the operation of the power unit and the operation of the accessory from the power unit.

EDWARD A. ROCKWELL.